US012661728B2

(12) United States Patent
Kuisle et al.

(10) Patent No.: US 12,661,728 B2
(45) Date of Patent: Jun. 23, 2026

(54) DEVICE FOR GRINDING AND/OR MILLING TEETH OF SAW BANDS

(71) Applicant: Georg Kesel GmbH & Co. KG,
Kempten (DE)

(72) Inventors: Martin Kuisle, Bidingen (DE); **Klaus
Lechner,** Pfronten (DE)

(73) Assignee: Georg Kesel GmbH & Co. KG,
Kempten (DE)

( * ) Notice: Subject to any disclaimer, the term of this
patent is extended or adjusted under 35
U.S.C. 154(b) by 218 days.

(21) Appl. No.: 18/626,769

(22) Filed: Apr. 4, 2024

(65) Prior Publication Data
US 2024/0342814 A1 Oct. 17, 2024

(30) Foreign Application Priority Data
Apr. 12, 2023 (DE) ..................... 10 2023 109 173.5

(51) Int. Cl.
*B23D 65/04* (2006.01)
*B23C 3/12* (2006.01)
(52) U.S. Cl.
CPC ................ *B23D 65/04* (2013.01); *B23C 3/12*
(2013.01)
(58) Field of Classification Search
CPC .......... B23D 65/04; B23C 3/12; B24B 19/009
See application file for complete search history.

(56) References Cited

U.S. PATENT DOCUMENTS

| 1,480,627 | A | * | 1/1924 | Muller | B23D 65/04 |
| | | | | | 76/112 |
| 3,854,889 | A | * | 12/1974 | Lemelson | G11B 27/102 |
| | | | | | 198/465.1 |
| 4,335,630 | A | * | 6/1982 | Gunzner | B23D 65/04 |
| | | | | | 409/190 |
| 4,693,145 | A | * | 9/1987 | Gustavsson | B23D 65/02 |
| | | | | | 76/112 |
| 4,778,315 | A | * | 10/1988 | Duffy | B23Q 11/1084 |
| | | | | | 409/137 |
| 5,016,497 | A | * | 5/1991 | Sundstrom | B23D 65/02 |
| | | | | | 409/173 |
| 5,038,647 | A | * | 8/1991 | Biagiotti | B26D 1/54 |
| | | | | | 83/458 |
| 5,647,259 | A | * | 7/1997 | Biagiotti | B26D 3/16 |
| | | | | | 83/458 |
| 6,123,270 | A | * | 9/2000 | Hara | B23Q 11/1076 |
| | | | | | 408/56 |

(Continued)

FOREIGN PATENT DOCUMENTS

DE 3537059 A1 5/1986

*Primary Examiner* — Sean M Michalski
(74) *Attorney, Agent, or Firm* — Notaro, Michalos &
Zaccaria P.C.

(57) ABSTRACT

A device and method for grinding and/or milling teeth of
saw bands where a feed device for the clocked feeding of a
temporary workpiece is formed from a plurality of mutually
parallel saw bands includes a clamping unit into which the
temporary workpiece is clamped, and a machining unit with
at least one machining tool for simultaneous machining of a
plurality of teeth of the temporary workpiece is individually
modifiable and with which these types of teeth of saw bands
can be efficiently and economically manufactured. The
clamping unit is displaceable together with the feed device
along a feed direction.

13 Claims, 7 Drawing Sheets

(56) References Cited

U.S. PATENT DOCUMENTS

| | | | | |
|---|---|---|---|---|
| 6,213,843 | B1 * | 4/2001 | Kramer | ................... B24B 49/16 |
| | | | | 451/21 |
| 12,064,825 | B2 * | 8/2024 | Klug | ....................... B24B 3/586 |
| 2008/0236830 | A1 * | 10/2008 | Fuhst | ....................... B23B 27/10 |
| | | | | 166/298 |

* cited by examiner

DEVICE FOR GRINDING AND/OR MILLING TEETH OF SAW BANDS

CROSS-REFERENCE TO RELATED APPLICATIONS

This patent application claims the benefit and priority of German Patent Application No. 10 2023 109 173.5, filed on Apr. 12, 2023, the disclosure of which is incorporated by reference herein in its entirety as part of the present disclosure.

FIELD

The present invention relates to a device for grinding and/or milling teeth of saw bands, having a feed device for the clocked feeding of a temporary workpiece, wherein the temporary workpiece is formed from a plurality of mutually parallel saw bands, a clamping unit into which the temporary workpiece is clamped, and a machining unit with at least one machining tool for simultaneous machining of a plurality of teeth of the temporary workpiece, and a method for grinding and/or milling of teeth of saw bands.

BACKGROUND

Saw bands are of great economic importance in a variety of machining methods and are used extensively, in particular in trades for cutting, separating, or for dismantling components, and also within rescue operations by the fire brigades. Saw bands are also used in industry, in particular during the machining of metals, plastics, or wood, and in the food processing industry, in particular for frozen fish products or also frozen meat products. Therefore, high demands are placed on the precision of the tooth geometries.

Saw bands generally have a large variability with respect to their tooth width and geometry. They are conventionally manufactured from a blank, in that a metal strip is unwound from a coil, if necessary rotated and straightened. This metal strip is then machined to generate the teeth. The machining may thereby be carried out either by grinding and/or by milling. If necessary, a cutting of the saw bands to the desired length is then carried out, or a repeated rotating and winding up of the manufactured saw bands into a saw band coil is carried out. The unwinding of the blank from the coil and the following work steps are usually carried out in cycles, certainly within the scope of the work steps, with which a saw band to be manufactured is continuously processed. In this case, buffer paths must be planned, if necessary, between the individual processing stations (machines), in case the timing is not maintainable through the entire manufacturing line.

SUMMARY

A device for grinding carbide-tipped teeth of saw bands is known from the prior art, which has two feed devices for the clocked feeding of a temporary workpiece, wherein the temporary workpiece is formed from a plurality of mutually parallel saw bands. Furthermore, the device according to the prior art has a rigid and stationary clamping unit, into which the temporary workpiece is clamped, and a grinding tool for simultaneous grinding of a plurality of teeth of the temporary workpiece.

The disadvantage of the prior art lies in the need for two feed devices for the clocked feeding of the temporary workpiece and the arrangement of the clamping unit as a stationary unit in the feed direction. Furthermore, modification and customization of the device is limited due to the stationary clamping unit.

Therefore, the underlying object of the present invention is to provide an individually modifiable, efficient, and economical device and a method of this type for grinding and/or machining the teeth of saw bands.

This problem is solved with regard to the device by a device for grinding and/or machining teeth of saw bands, having a feed device for the clocked feeding of a temporary workpiece, wherein the temporary workpiece is formed from a plurality of mutually parallel saw bands, a clamping unit into which the temporary workpiece is clamped, and a machining unit with at least one machining tool for simultaneous machining of a plurality of teeth of the temporary workpiece, wherein the clamping unit is displaceable along a feed direction together with the feed unit.

The feed device particularly preferably has a travel path of between 500 mm to 600 mm, preferably between 550 mm and 580 mm, particularly preferably 565 mm along a horizontal feed direction. The feed unit preferably has a ball screw drive as a feed drive for driving in and counter to the feed direction, which is covered in particular by a bellows and is thus protected from contamination by dust or chips. A clamping width of the clamping unit is advantageously roughly adjustable via a manual hand crank, and subsequently clampable to a predefined value via a hydraulic or pneumatic cylinder. The clamping width preferably lies between 0 mm and 100 mm, preferably between 0 mm and 80 mm, particularly preferably between 0 mm and 60 mm. The clamping path traversable by the cylinder is around 8 mm. In one particularly advantageous embodiment, the clamping unit has clamping pressure monitoring, so that upon reaching a predefined clamping pressure of, in particular 200 bar, a message may be output to a user, and/or additional manufacturing steps may be introduced after reaching a predefined clamping pressure. During a first clamping of the temporary workpiece in the clamping unit, the mutually parallel saw bands are insertable up to a band stop of the clamping unit, arranged in the feed direction of the same. A uniform alignment of the mutually parallel saw bands to one another in the feed direction is guaranteed by the band stop. The band stop is particularly advantageously displaceable for this first insertion of the saw bands, so that it does not impede a transport of the saw bands for the later method steps. The band stop is particularly advantageously arranged on a press down unit and is displaceably mounted via the same. The band stop is insertable prior to an initial insertion of the mutually parallel saw bands, in particular between the clamping jaws of the clamping unit, and is insertable perpendicular to the same. In order to maintain the manufacturing of the teeth of the saw bands to be as efficient as possible, the clamping unit may be displaced and the temporary workpiece may be formed in such a way in another step that the teeth to be manufactured are arranged as close as possible to the ends of the mutually parallel saw bands. Advantageously, the mutually parallel saw bands of the temporary workpiece directly contact one another, so that they mutually support each other from damage, in particular against the formation of burrs or bending. The machining tool has, in particular, a full profile or a shift profile, wherein a full profile has a profile contour in such a way that tooth backs or tooth faces of immediately consecutive teeth are manufactured during one processing step. The profile contour of the full profile has a tool tooth width, which is less than a width of a tooth gap to be manufactured of the tooth contour between two immediately consecutive teeth of the band saw blade. In contrast, a shift profile has a profile contour, whose tool tooth width corresponds to the width of a tooth gap to be manufactured of the tooth contour between two immediately consecutive teeth of the band saw blade, wherein, when machining a temporary workpiece with a shift profile as the machining tool, each second tooth gap of the tooth contour of the saw band simultaneously processible. A displacement of the temporary workpiece along the machining tool as a full profile for manufacturing teeth is accordingly in particular a few millimeters, by which the tooth gap of the tooth contour of the saw band is wider than the tool tooth width, and a displacement of the temporary workpiece along the machining tool as a shift profile is one tooth width of the tooth contour. One tooth width corresponds to a maximum extension of a tooth of the temporary workpiece along the feed direction.

In one advantageous embodiment of the invention, the clamping unit is arranged on the feed device. Due to a rigid connection between the clamping unit and feed device, in particular of the clamping unit and a feed slide of the feed device, said feed slide being displaceable along the feed direction, a precise movement of the clamping unit, and thus of the correspondingly clamped temporary workpiece, and also of the general feed and offset, and also the further transport of the saw bands within the device, is advantageously realized with only one drive, namely that of the feed device for moving the feed slide.

A further embodiment of the invention provides that clamping jaw edges of the clamping unit are oriented along the feed direction and are at least twice as long as a machining width of the machining tool. In one particularly advantageous embodiment, the clamping jaw edge has a length of 200 mm to 400 mm, preferably from 250 mm to 350 mm, particularly preferably of 300 mm. Therefore, the machining width is analogously 100 mm to 200 mm, preferably 110 to 150 mm, particularly preferably 127 mm. Due to this advantageous refinement of the invention, an identical temporary workpiece may be processed twice by the machining unit, so that all non-productive times, which are generated by the releasing of the clamping, by the pressing down, and by the renewed clamping by the clamping unit, are eliminated for each second machining process, and the manufacturing time per tooth of the saw bands is thus significantly reduced, which in turn makes the manufacturing more efficient.

In one refinement of the invention, the clamping jaw edges have a tooth contour at least in sections with a plurality of teeth. By this means, damage to the teeth of the saw bands, which form the outer surfaces within the temporary workpiece, or lie in an outer area of the temporary workpiece, arising from the large forces on the temporary workpiece arising from the machining unit, is particularly advantageously mitigated. A folding over or warping and also a formation of burrs on the teeth of the temporary workpiece is efficiently prevented. The clamping jaws in one particularly preferred embodiment are made from a hardened steel and have, in particular, a more deeply engrained tooth contour than that of the temporary workpiece processed by the machining unit, so that a direct engagement of the machining unit into the clamping jaws is prevented. By this means, these have only minor wear and are seldom exchanged, in particular every 100,000 clamping cycles. The clamping jaws particularly advantageously have a tooth contour engrained from 0.02 mm to 0.07 mm, preferably approximately 0.05 mm deeper than the temporary workpiece processed by the machining unit.

A further embodiment of the invention provides that a press down unit for pressing down the temporary workpiece is arranged on the feed device. In particular, the press down unit is arranged above the clamping unit on the feed slide of the feed device. Before the clamping the temporary workpiece, the saw bands arranged mutually parallel are advantageously pressed down, in particularly hydraulically, on a flat support surface by the press down unit, so that these are also positioned in a uniform layer in a vertical direction, in addition to their parallel alignment. The support surface is formed, in particular, by the clamping unit. The press down unit in one particularly preferred embodiment is arranged to be displaceable on the feed device, so that it may enter and exit the processing space as needed. The processing space is defined as the area, which is necessary for the respective units participating in a certain process step during the process step. For example, the press down unit is located within the processing space, if the saw bands arranged mutually parallel are pressed down and are subsequently reliably clamped. In particular during the machining step of the temporary workpiece by means of the machining unit, the press down unit is displaced in such a way that a collision of this with the machining unit is reliably prevented. During the step of pressing down, the press down unit is therefore located in a first position, wherein it is arranged in this first position closer to the mutually parallel saw bands than in a second position of the press down unit. The first and second positions are oriented perpendicular to the feed direction and horizontally offset to one another. The press down unit particularly advantageously has two press down tools for the pressing down, wherein the press down tools are particularly designed as triangular knives and/or are made from hardened steel. The press down tools are held within the press down unit via tool holders, wherein these are displaceable in the feed direction in such a way that the position of the press down tools is adaptable to the tooth contour of the teeth of the saw bands to be manufactured. A spacing between the two press down tools is thereby to be selected in such a way that neither of the press down tools contacts a tooth crest of a manufactured tooth during the manufacturing and potentially damages the same. The adjustment of the spacing is to be adjusted at the beginning of a manufacturing of a saw tooth contour which is new in comparison to a directly previously manufactured saw tooth contour. The displacement is carried out manually, the tool holders are frictionally fixable in their specific positions on the press down unit, in particular, by means of screw connections. The use of a triangular knife, thus, a press down tool with a cross section of an equilateral triangle, is particularly advantageous, as by this means due to wear of one edge, the triangular knife may be rotated by 60° about its longitudinal axis, so that a new edge of the triangular knife is directed to the mutually parallel saw bands, and presses the same down in a linear contact. This process may be repeated a total of twice, so that all three edges engage once with the mutually parallel saw bands. The angle defined by the edges of the triangular knife is likewise advantageous, as this is easily insertable into the mutually parallel saw bands in such a way that the tooth crests are not damaged.

In one possible advantageous embodiment, the device has at least one auxiliary clamping unit respectively in front of and behind the clamping unit along the feed direction. The auxiliary clamping units are advantageously arranged to be manually positionable on a machine bed of the device. They advantageously have the largest possible spacing permissible within the machine bed to the clamping unit, so that the maximum travel path of the clamping unit is influenced as little as possibly by the auxiliary clamping units. The mutually parallel saw bands are advantageously clampable in the auxiliary clamping units, so that they support the clamping effect of the clamping unit. An undesired displacement of the mutually parallel saw bands among themselves may be prevented by the auxiliary clamping unit, in particular during an opening of the clamping unit. Therefore, a constantly secure positioning of the mutually parallel saw bands during an entire processing process may be realized via the arrangement of the clamping unit and the auxiliary clamping units for clamping the same. The auxiliary clamping units are to be closed and/or opened, in particular hydraulically or pneumatically. In one particularly advantageous embodiment of the invention, the auxiliary clamping units are arranged relative to the clamping unit in such a way that a temporary workpiece is formed from a first end of a first auxiliary clamping unit, which is arranged spaced apart from the clamping unit, to a second end of a second auxiliary clamping unit, which is likewise arranged spaced apart from the clamping unit. Depending on the travel path of the machining unit, a very large quantity of teeth of the mutually parallel saw bands may be manufactured using an identical temporary workpiece. During one machining step, the mutually parallel saw bands are clamped both via the clamping unit and also via the auxiliary clamping units. During a displacement of the temporary workpiece in the feed direction, the mutually parallel saw bands are clamped via the clamping unit, the auxiliary clamping units are opened, and the saw bands may be displaced along the feed direction. For the initial clamping in of the mutually parallel saw bands into the rear auxiliary clamping unit in the feed direction, the saw bands are advantageously clamped into the clamping unit in such a way that they project past the clamping unit. Specifically, the mutually parallel saw bands are clamped in the clamping unit in such a way that, during a displacement of the clamping unit into a rearmost position along the feed direction, they contact on at least 30% of the rear auxiliary clamping unit, preferably on at least 50%, particularly preferably on at least 70%.

One refinement of the invention provides that the machining unit has a grinding tool and/or a milling tool. Both a grinding and also a milling process are chipping processes, in which abrasive material is detached from a workpiece, in this invention from the temporary workpiece, by means of a machining tool. Both grinding and also milling processes may be carried out using the device according to the invention. During a usage of a grinding tool, this is introduced into the temporary workpiece in particular by means of deep grinding methods or creep feed grinding methods. Consequently, a vertical adjustment of the machining tool is carried out as a first step, so that a total vertical adjustment is performed. Subsequently, the grinding tool is horizontally introduced into the temporary workpiece perpendicular to the feed direction. The feed speed of the grinding disk in this method is namely low, in particular in comparison to the speed in a plunge grinding method; however, a plurality of teeth of the mutually parallel saw bands may be simultaneously processed due to the formation of the temporary workpiece and across the width of the grinding disk, which in turn proportionally reduces their individual processing duration. Furthermore, each tooth back and each tooth face is ground to measure in one feed cycle. The introduction of the grinding tool into the temporary workpiece by means of plunge grinding methods is likewise possible.

In one advantageous refinement of the invention, the device additionally has a dressing unit, wherein the dressing unit is displaceable along a first and/or a second axis for dressing the machining tool, wherein the dressing unit has a respective dressing drive for the displacement along the first and second axes. The dressing unit is advantageously integrated into the device in such a way that it mountable and/or demountable depending on the type of machining tool. A grinding disk as the machining tool is preferably dressable by means of the dressing unit. In the case that the device is to have a milling tool as the machining tool, a dressing unit is not necessary, and this may be demounted from the device in order to maintain the possible processing space to be as large as possible within the device. The entire dressing unit is advantageously fixedly mountable in the device via an adapter plate, wherein the dressing unit is displaceable along a first axis. If there is a need to displace the dressing unit along a further axis, the adapter plate is to be replaced by a unit for movement along a second axis. The first and second axes are advantageously arranged perpendicular to one another. The necessary connection options for the units for displacing the dressing unit along a first and/or second axis are preferably contained in the device by default, so that these units and the entire dressing unit may be freely retrofitted. As a drive is respectively provided for the displacement along both axis, these are controllable independently from one another. The dressing tool is particularly advantageously mutually displaceable with a drive unit of the dressing unit in at least one, preferably in both, of the first and second axes. In one advantageous embodiment, the entire dressing unit is arranged on the machining unit.

One advantageous embodiment of the invention provides that the dressing unit has a receptacle for receiving at least two dressing tools which are different from one another. The dressing tool is preferably selectable from a diamond profile roller and a diamond wheel, wherein the diamond profile roller has, in particular, the negative contour of the machining tool, in this case the grinding disk, in order to intermittently bring this back to measure and to prevent contour deviations caused by wear. During the use of a diamond profile roller, the machining tool may be simultaneously dressed across its entire machining width in an advantageous way. The necessary non-productive time for dressing the machining tool is thus substantially reduced in an advantageous way. The diamond profile roller is thereby movable, in particular across at least one axis, by means of a respective linear drive, wherein each movement is carried out along the respective axis via an autonomous motor. The use of the diamond wheel as the dressing tool is then in particular advantageous if the profile of the teeth of the mutually parallel saw bands often differ, and correspondingly a certain adjustability of the machining tool is necessary. The diamond wheel is thereby advantageously accommodatable in the same receptacle within the dressing unit as the diamond profile roller, and in particular may be positioned and clamped via a spacing sleeve. The diamond wheel may be displaced along the negative tooth profile of the machining tool via both dressing drives of the dressing unit and thus introduces a custom contour into the same. The dressing process is hereby extended in time in comparison to that with a diamond profile roller; however, the modification capability of the machining tool, and thus of the tooth contour of the saw bands to be manufactured, is enormously increased.

In one preferred embodiment of the invention, the machining unit has a sensor unit, wherein a contact between the machining tool and the dressing tool is measurable by the sensor unit. In one preferred embodiment, the sensor unit has an acoustic emission sensor, which is arranged inside of the machining tool, which is designed in particular as a grinding disk. The sensor unit may likewise be accommodated in a tool holder of the machining unit, in which the machining tool is mounted to be rotatably movable, so that the sensor unit may perceive a vibration upon contact of the machining tool on the dressing tool, and may perceive a course of a vibration in a particularly advantageous way. In one particularly preferred embodiment, a uniform dressing of the machining tool, in particular of the grinding disk, using the dressing unit is guaranteed due to the reception of the course of the vibration by the sensor unit. In particular, a fault based on a removal of too much material from the grinding wheel by the dressing unit is detectable. A corresponding upper limit value may be determined for preventing collisions or damage of both units, in order to interrupt the dressing process, in particular upon exceeding the upper limit value. In addition, the dressing process may be repeated upon underrunning a lower limit value and/or too great a deviation of a predefined course of the vibration. A consistent and reliable contour creation on the grinding wheel is correspondingly advantageously guaranteed.

One refinement of the invention provides that the device has a cooling unit for cooling the machining tool comprising a plurality of nozzles directed at the machining tool, wherein the cooling unit is displaceable in such a way that a predefined spacing between the nozzles and the machining tool is essentially constant. The plurality of nozzles within the cooling unit are particularly advantageously adjustable to the contour of the machining tool. The nozzles, in particular nozzle outlets of the nozzles are hereby adjustable in three directions, that is, vertical, horizontal, and into the depth of the device. On the one hand, the cooling unit has a cooling effect and on the other hand, it has a cleaning and an air deflecting effect on the machining tool. Due to a fluid applied via the nozzles onto the machining tool, the same is cooled, on the one hand, and on the other hand particles, like chips and dust, are detached from the machining tool at a high speed of the impinging fluid. Furthermore, ambient air, moved by the rotation of the machining tool, is deflected from the machining tool via the fluid. In one preferred embodiment, the cooling unit consists of two cooling subunits comprising respective nozzles, wherein the nozzles of the one cooling subunit are oriented in such a way that fluid output from them deflects the ambient air from the machining tool and cleans and saturates the same. The nozzles from the other cooling subunit are preferably oriented in such a way that the fluid output from them generates a cooling lubrication of the machining tool. The fluid is advantageously a cooling lubricant, in particular an emulsion or an oil, which has good flow properties and thermal conduction properties. In particular, a grinding burn during a grinding process is advantageously prevented by this means. The displaceability of the entire cooling unit guarantees a constant cooling and cleaning performance of the cooling unit on the machining tool, even if its dimensions change due to wear. The cooling unit is hereby displaceable along at least one axis, preferably along at least two axes. The drive of the cooling unit is carried out in one preferred embodiment by means of one linear drive per axis. A maximum linear travel path of the cooling unit along one axis lies preferably between 100 and 150 mm, particularly preferably at 130 mm.

The underlying object of the present invention with respect to a method is solved by a method for grinding and/or milling teeth of saw bands, in particular using the device according to one of the preceding claims, having the following steps: pressing down and clamping a plurality of parallel, identical saw bands to generate a temporary workpiece, first simultaneous machining of a first plurality of teeth of the temporary workpiece to generate either tooth backs and/or tooth faces, first displacement of the temporary workpiece along a feed direction, second simultaneous machining of the first plurality of teeth to generate either tooth backs and/or tooth faces, depending on which were not generated during the first simultaneous machining, second displacement of the temporary workpiece along a feed direction, direct repetition of the first displacement of the temporary workpiece and of the first and second simultaneous machining of a further plurality of teeth of the temporary workpiece.

In one advantageous embodiment of the method, the steps of the displacement of the temporary workpiece and the renewed simultaneous machining of a plurality of teeth of the temporary workpiece are directly repeated at least three times. Non-productive times due to a loosening, a renewed pressing down and clamping in, are hereby efficiently reduced and even halved. The first displacement of the temporary workpiece is preferably less than or equal to a tooth width of the teeth of the saw bands. The first displacement is particularly advantageously exactly one tooth width of the teeth of the saw bands, if a machining tool has a shift profile, by means of which every second tooth gap between consecutive teeth of the tooth contour is simultaneously manufactured. If the machining tool has a full profile, the first displacement is less than one tooth width of the teeth of the saw bands. Furthermore, if the machining tool has a full profile, either the tooth backs or tooth faces are respectively simultaneously manufactured during the first simultaneous machining. The advantage in using a machining tool with a shift profile is the additional generation of one tooth per the first and second consecutively following simultaneous machining, which further advantageously shortens the manufacturing time per tooth. When using a machining tool with both a shift profile and also with a full profile, the teeth of the saw bands are machined in such a way that the tooth back and the tooth face of one tooth of the saw band are manufactured chronologically offset from one another, namely during a first or a second simultaneously machining, in order to form an edge of a tooth crest of a tooth to be as sharp as possible.

In [one] refinement of the method, the temporary workpiece is moved farther by the second displacement than by the first displacement. The first displacement forms tooth crests of the temporary workpiece, in that it merely generates a small offset along the feed direction, and thus the tool generates the tooth back and the tooth face in two machining travel paths that differ from one another. A sharp edge at the tooth crest may thus be ensured. The second displacement positions the temporary workpiece under the machining unit such that it preferably directly further manufactures the row of teeth during a further consecutive machining, so that it may no longer be concluded after one machining pass how large the actual machining width of the machining unit is.

In one particularly advantageous embodiment of the method, the first and/or second displacement of the temporary workpiece is less than or equal to a machining width of a machining tool. In one preferred embodiment, the first displacement of the temporary workpiece is less than 3 mm, preferably less than or equal to 2 mm, particularly preferably less than or equal to 1 mm, wherein the second displacement of the temporary workpiece is preferably a machining width of the machining tool, particularly preferably a machining width minus the width of the first displacement.

In one preferred refinement of the method, a clamping unit, clamping the temporary workpiece, and a feed unit, displacing the temporary workpiece, are moved together in an unchanging relative position to one another. The clamping unit is hereby advantageously used on the one hand to move the temporary workpiece along the feed direction, on the other hand to clamp it, in order to fix the temporary workpiece during a processing of the same via a machining unit. Accordingly, two tasks may be completed by one unit or by the combination of a feed device and a clamping unit, without necessitating additional components.

The invention is described by way of example in multiple preferred exemplary embodiments with reference to a drawing, wherein further advantageous details of the figures are to be gathered from the drawing.

Functionally identical parts are thereby provided with the same reference numerals.

BRIEF DESCRIPTION OF THE DRAWINGS

The figures of the drawing shown in detail in:

FIG. 4 Fourth section of a perspective side view of the device;

FIG. 5 Perspective view of the dressing unit in a first embodiment;

FIG. 6 Perspective view of the dressing unit in a second embodiment.

DETAILED DESCRIPTION

Figure 1:
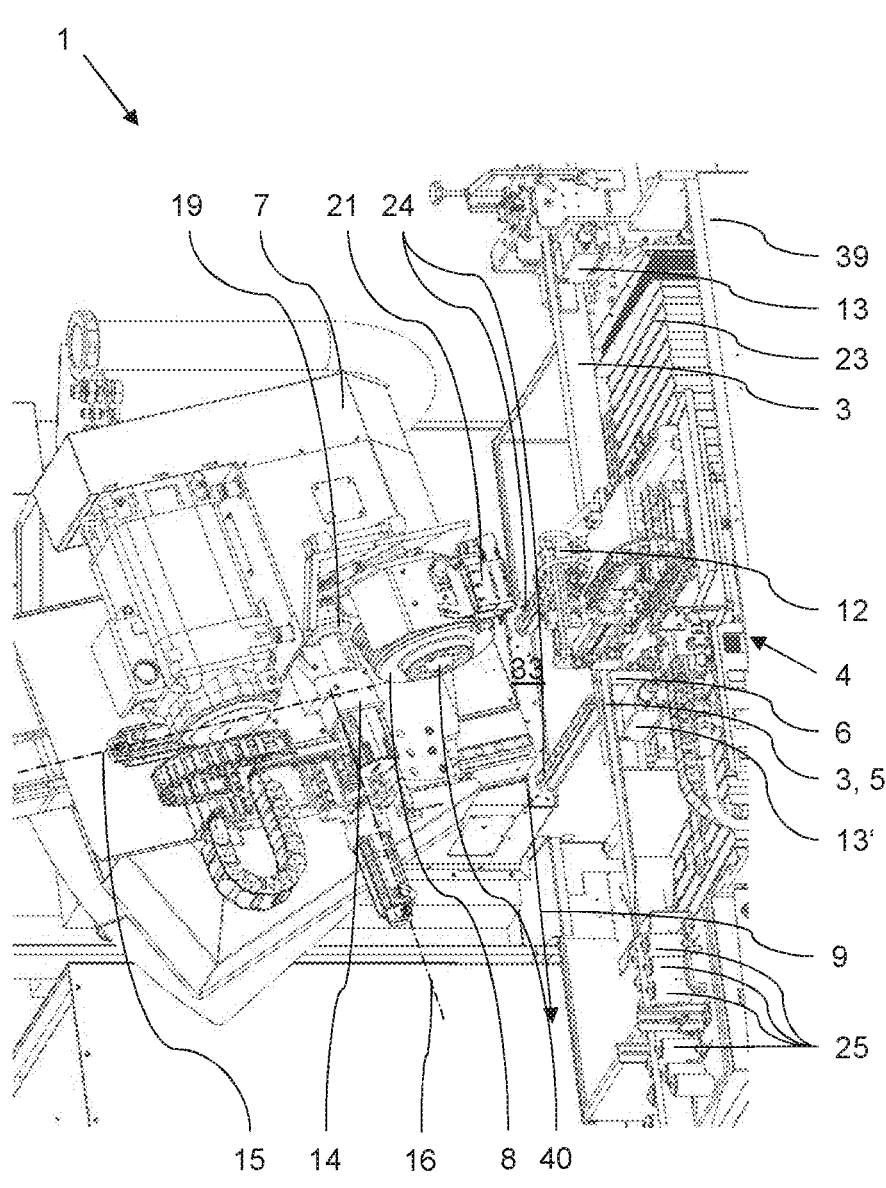
FIG. 1 First section of a perspective side view of the device.

FIG. 1 shows a first section of a perspective side view of device 1 comprising a feed device 4, a clamping unit 6 arranged thereon, and a press down unit 12 likewise arranged thereon. Feed device 4 is accommodated in a machine bed 39. A temporary workpiece 5 made of saw bands 3 arranged directly and mutually parallel is in clamping unit 6. A machining unit 7 is arranged above feed device 4, clamping unit 6, and press down unit 12, wherein machining unit 7 in this preferred embodiment has a grinding disk as machining tool 8, which is rotatably mounted via a tool holder 40 of machining unit 7. A linearly displaceable cooling unit 21 is arranged on machining unit 7 for cooling machining tool 8 and temporary workpiece 5 in a use case. A dressing unit 14 with a diamond wheel as dressing tool 19 is likewise arranged on machining unit 7, wherein dressing tool 19 is displaceable along a first axis 15 and a second axis 16 arranged perpendicular to first axis 15 for customized dressing of machining tool 8. An auxiliary clamping unit 13 is arranged along a feed direction 9 in front of clamping unit 6 and an auxiliary clamping unit 13' is likewise arranged behind clamping unit 6 for clamping and fixing the plurality of saw bands 3 arranged mutually parallel. In the direction of feed direction 9, mutually parallel saw bands 3 have teeth, not depicted, which are introduced by machining unit 7. A not visible feed spindle 26 of feed device 4 is covered by means of a bellows 23, in order to protect the same from chips and other contaminants arising during manufacturing. Machining unit 7 rests on two rail guides 24, so that the same is displaceable in the horizontal direction perpendicular to feed direction 9, and may thus process temporary workpiece 5 by means of creep feed grinding methods. Machining unit

7 likewise has a linear guide, which is oriented in a vertical plane in such a way that an imaginary straight line connecting the tooth crests of the teeth to be manufactured lies in a horizontal plane. Machining tool 8 is displaceable, in particular in the vertical direction, by means of the linear guide of machining unit 7. Guide rollers 25 for guiding saw bands 3 are arranged in feed direction 9 behind rear auxiliary clamping unit 13'. Clamping jaws 28 of both clamping unit 6 and also those of auxiliary clamping units 13 are displaceable parallel to rail guides 24 of machining unit 7. A free space between feed device 4 and machining unit 7 is defined as processing space 33 of the device.

Figure 2A:
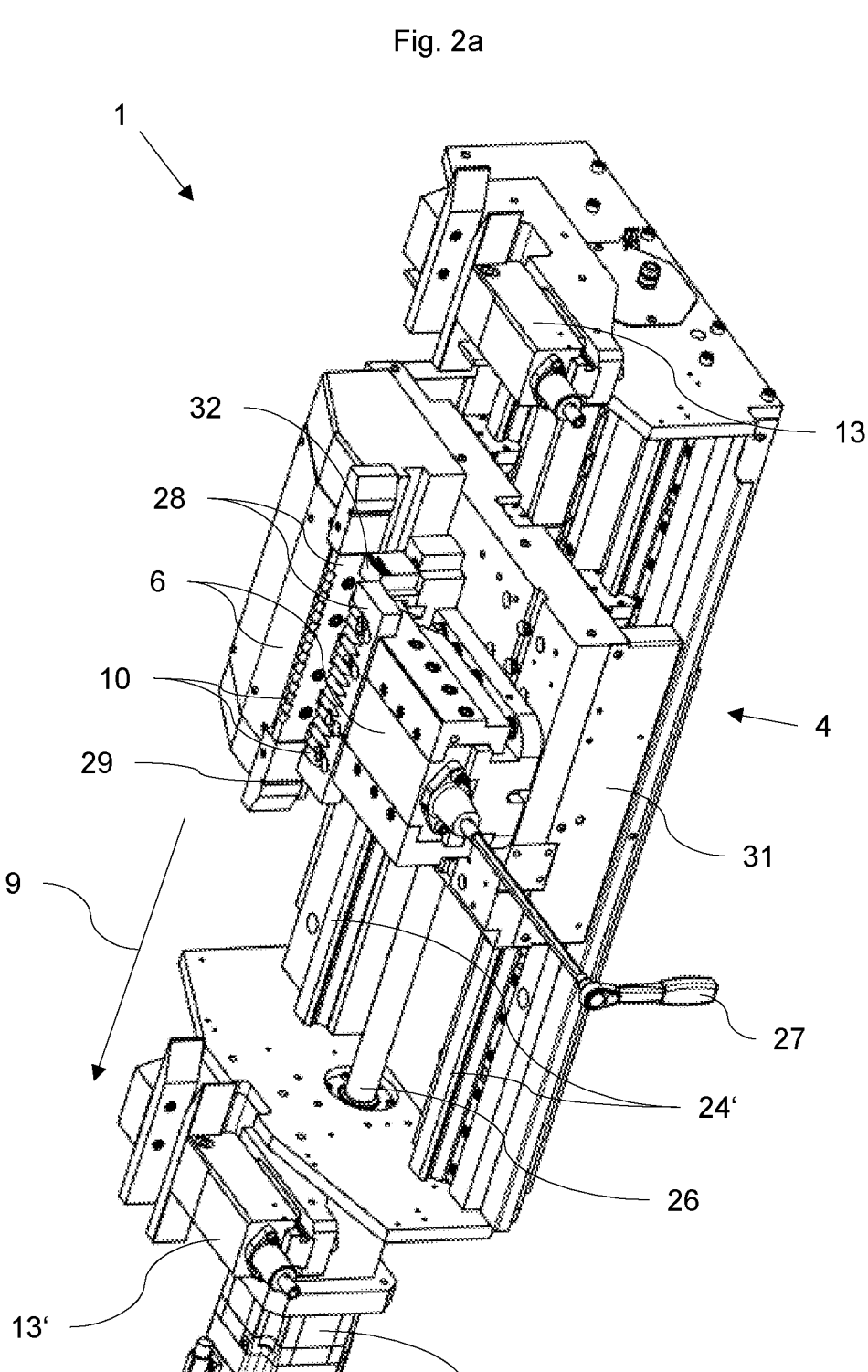
FIG. 2*a* Second section of a perspective side view of the device.

FIG. 2*a* shows a second section of a perspective side view of device 1 comprising feed device 4 without bellows 23, so that feed spindle 26 is visible. The feed spindle translates a rotational movement, generated by a feed drive 30, into a potential linear movement along feed direction 9 of a feed slide 31, on which clamping unit 6 is arranged. Feed slide 31 is likewise mounted via two rail guides 24'. Feed direction 9 is correspondingly oriented parallel to the longitudinal axes of rail guides 24' of feed device 4. Clamping device 6 is pre-adjustable by means of a manual clamping lever 27 to a specified width between clamping jaws 28 of clamping unit 6. Clamping jaws 28 may be hydraulically pressed together to a predefined pressure during a use of device 1 in order to clamp saw bands 3, not depicted, therein. A clamping jaw 28 of clamping unit 6 has a band stop groove 29, in which a band stop, not depicted, may be inserted and supported, in order to facilitate a first introduction and positioning of saw bands 3 in device 1. Clamping jaw edges 10 of clamping jaws 28 extend horizontally parallel to feed direction 9 and delimit vertical contact surfaces of clamping jaws 28, on which a saw band 3, not depicted, respectively contacts. Clamping jaw edges 10 may have a tooth contour at least in sections with a plurality of teeth. Clamping unit 6 further has a contact surface 32, arranged between clamping jaws 28 and on which temporary workpiece 5, not depicted, rests in a use case. Viewed along feed direction 9, an auxiliary clamping unit 13, 13' is arranged respectively in front of and behind clamping unit 6 for the accommodation of saw bands 3.

Figure 2B:
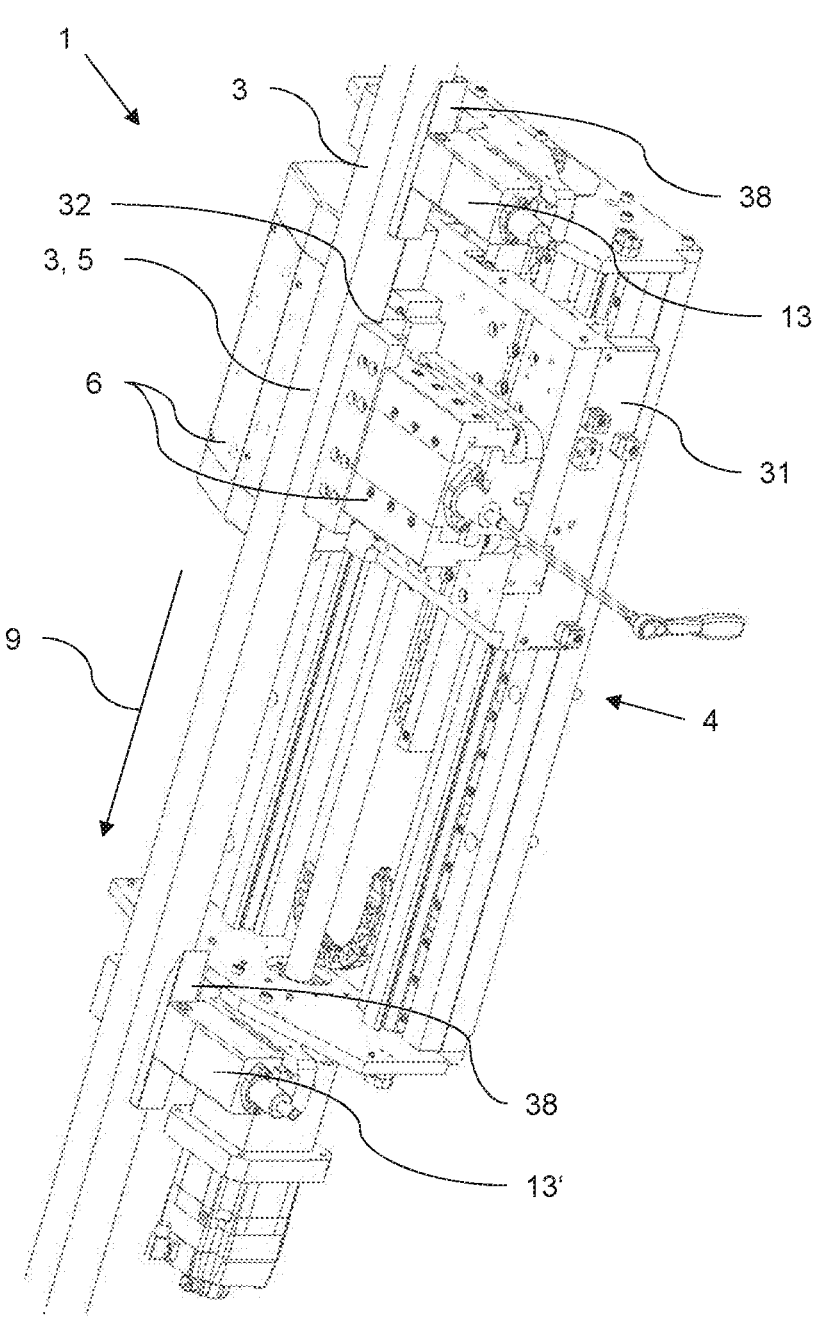
FIG. 2*b* Second section of a perspective side view of the device with a temporary workpiece.

FIG. 2*b* shows the second section, depicted in FIG. 2*a*, of a perspective side view of device 1 with temporary workpiece 5, which is clamped in clamping unit 6. Temporary workpiece 5 is depicted in a simplified way as a component; however, it is formed from a plurality of mutually parallel saw bands 3. Saw bands 3 are each further clamped between two auxiliary clamping jaws 38 of both auxiliary clamping units 13, 13'. Feed slide 31 of feed device 4 and accordingly also clamping device 6, which is rigidly connected to feed slide 31, are located in their foremost position in feed direction 9. Temporary workpiece 5 rests flat on a horizontal contact surface 32.

Figure 3:
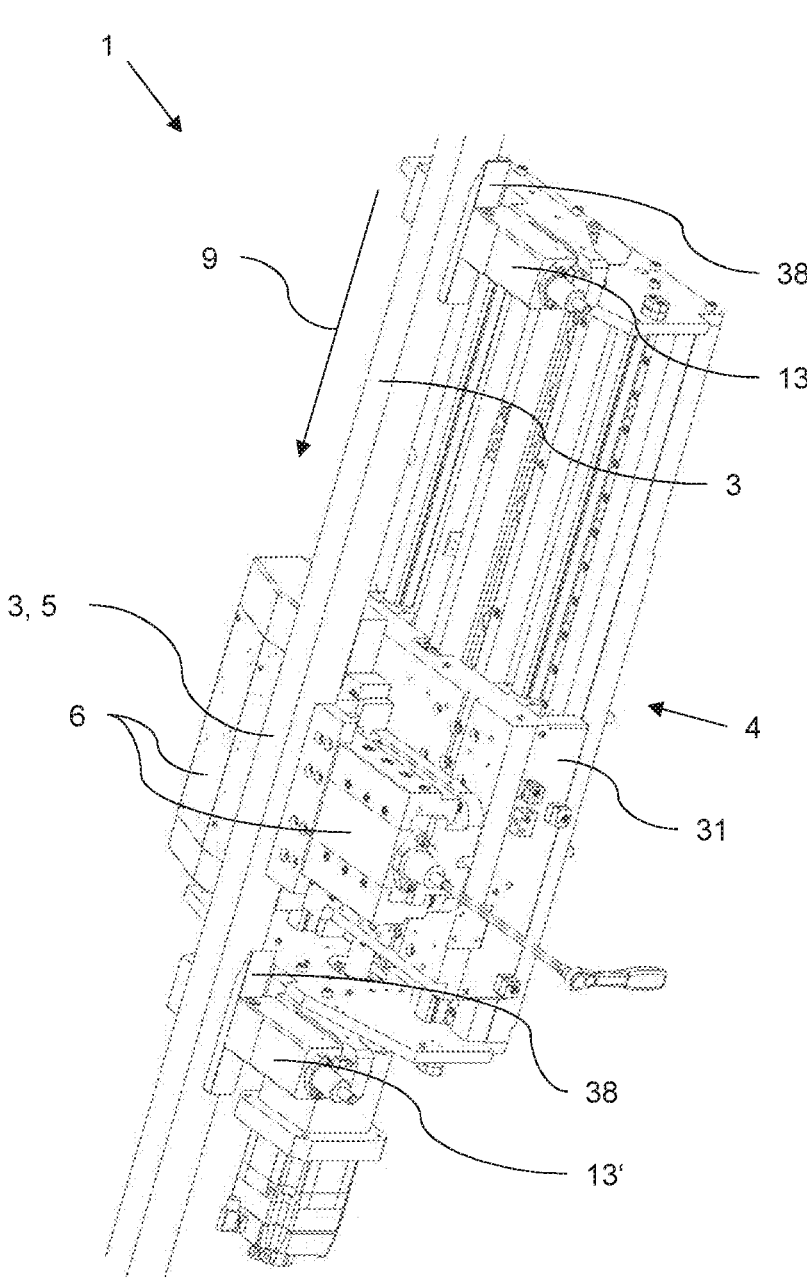
FIG. 3 Third section of a perspective side view of the device with a temporary workpiece.

FIG. 3 shows a third section of a perspective side view of device 1 with a temporary workpiece, wherein the third section depicts the same components of device 1 as the second section, with the difference that feed slide 31 of feed device 4, and accordingly also clamping device 6 are located in their rearmost position in feed direction 9. In this position, a processing of temporary workpiece 5 by machining unit 7, not depicted, is impossible. Instead, the displacement of temporary workpiece 5 in feed direction 9 by means of clamping unit 6 enables a clocking of saw bands 3 in a way that, upon releasing clamping unit 6 and releasing temporary workpiece 5, clamping unit 6 may subsequently move into a foremost position, depicted in FIGS. 2*a, b*, in order to once again clamp in a new temporary workpiece 5, whose processing has not yet been carried out by machining unit 7. During a displacement of clamping unit 6 counter to feed direction 9, saw bands 3 contact auxiliary clamping jaws 38, and are fixed via auxiliary clamping units 13, 13'.

Figure 4:
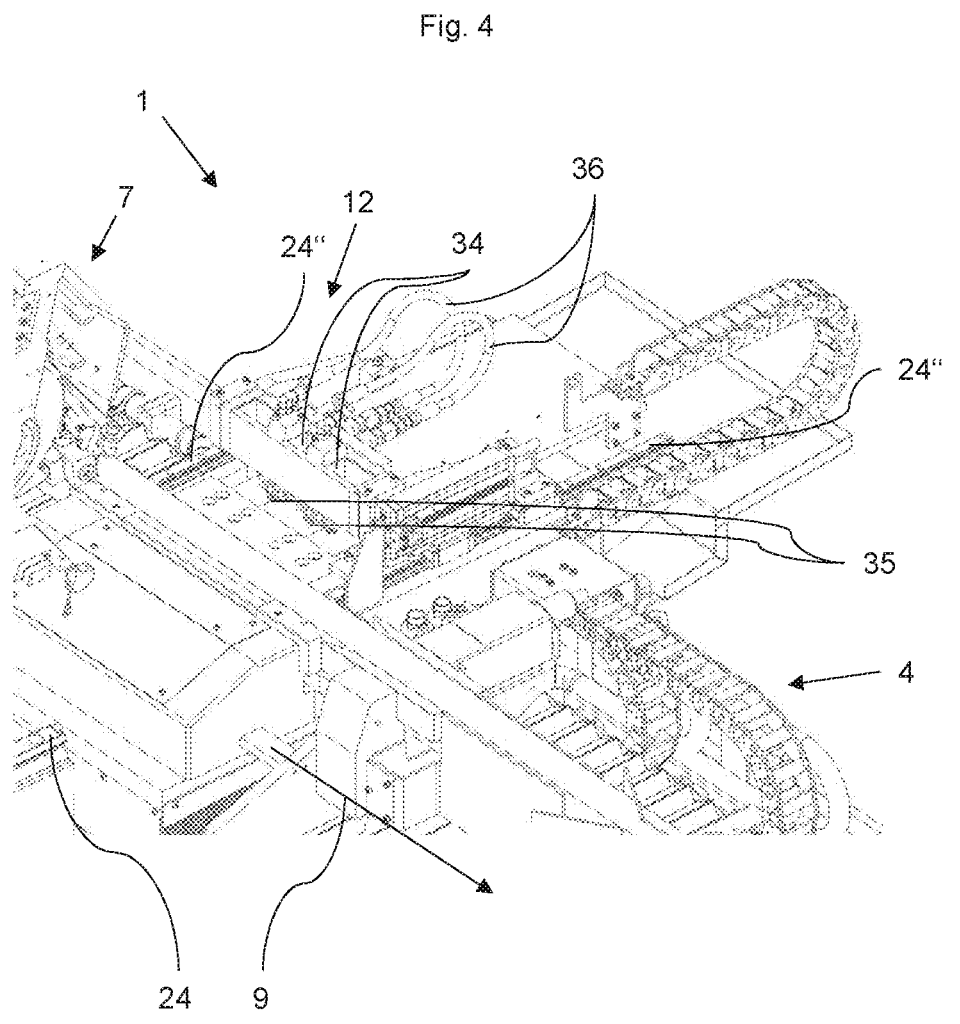

FIG. 4 shows a fourth section of a perspective side view of device 1, wherein a press down unit 12 is arranged on feed device 4 in addition to clamping unit 6. Press down unit 12 has rail guides 24" arranged parallel to rail guides 24 of machining unit 7. In addition, press down unit 12 has two tool holders 34, displaceable along feed direction 9, and press down tools 35 arranged thereon, wherein press down tools 35 are designed as triangular knives. A hydraulic hose 36 is respectively arranged on tool holders 34 in order to hydraulically depress press down tool 35 as needed.

Figure 5:
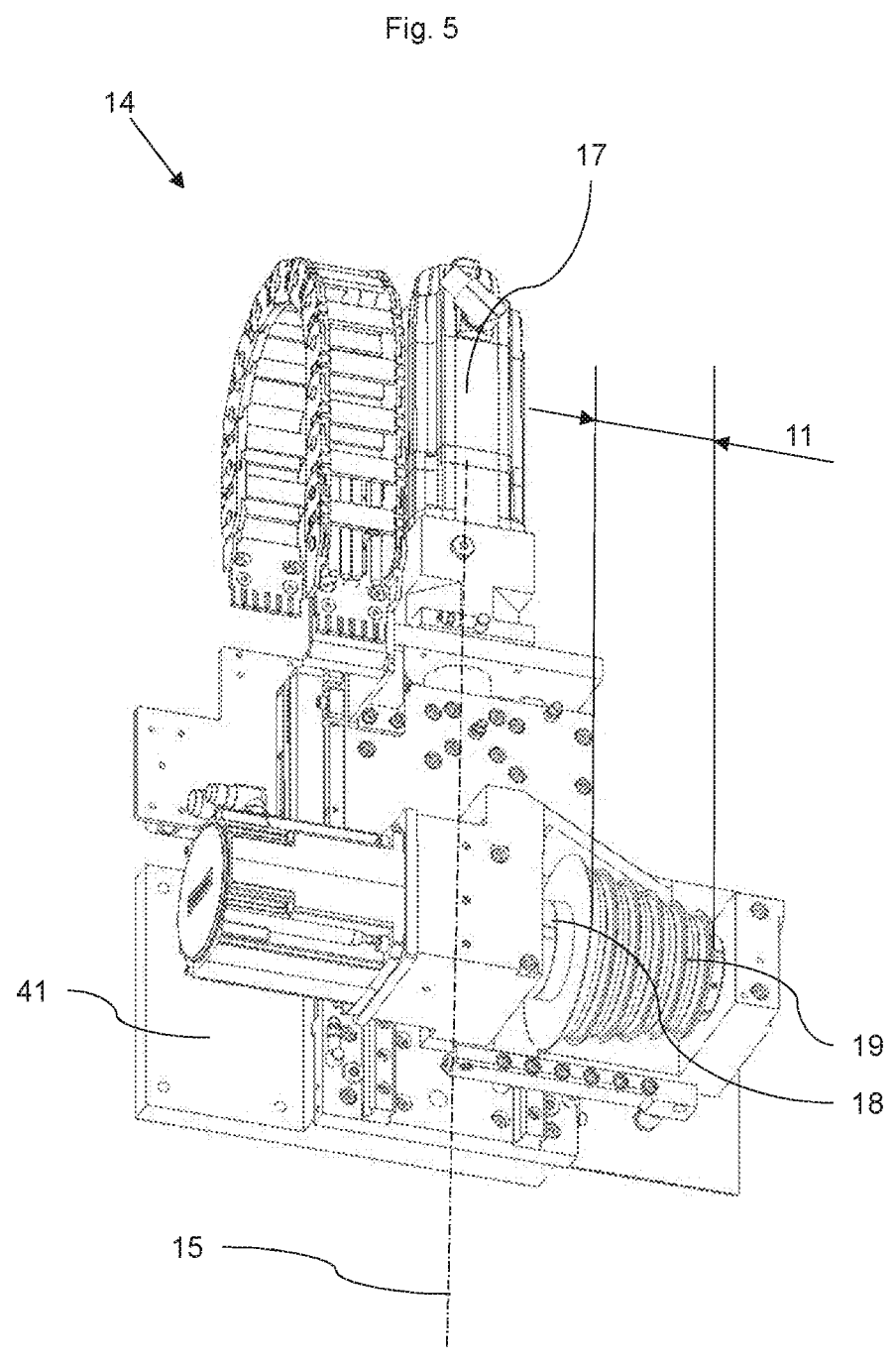

FIG. 5 shows a perspective view of dressing unit 14 in a first embodiment with a diamond profile roller as dressing tool 19, which is connected to a dressing drive 17 via a receptacle 18. Dressing unit 14 is displaceable along a first axis 15 in order to approach a machining tool 8, not depicted, and to correspondingly dress the same. The diamond profile roller has a negative contour of the contour of machining tool 8. In this embodiment, the width of dressing tool 19 corresponds to the machining width 11 of machining tool 8, not depicted. In this first embodiment, dressing unit 14 is mounted on an adapter plate 41.

Figure 6:
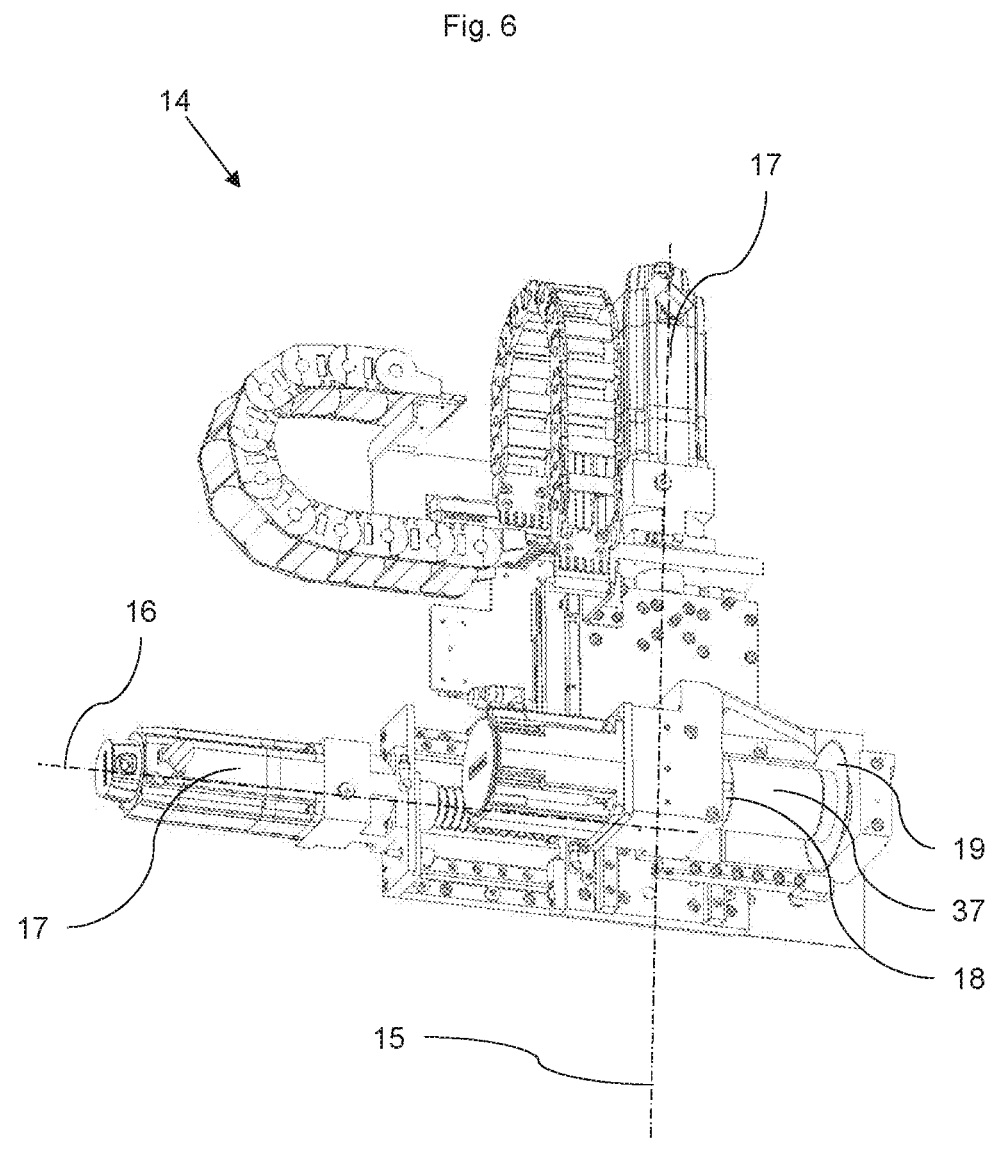

FIG. 6 shows a perspective view of dressing unit 14 in a second embodiment with a diamond wheel as dressing tool 19, which is likewise connected to a dressing drive 17 via receptacle 18. A spacing sleeve 37 is arranged adjacent to the diamond wheel as dressing tool 19 on receptacle 18, so that the diamond wheel is fixedly positionable. Dressing unit 14 is displaceable along a first axis 15 and along a second axis 16, so that dressing tool 19 may travel a custom contour on machining tool 8 to be dressed. In the second embodiment, adapter plate 41 is demounted and instead of that, dressing unit 14 is supplemented by the components for displacing dressing unit 14 along second axis 16.

LIST OF REFERENCE NUMERALS

1 Device
3 saw band
4 Feed device
5 Temporary workpiece
6 Clamping unit
7 Machining unit
8 Machining tool
9 Feed direction
10 Clamping jaw edge
11 Machining width
12 Press down unit
13, 13' Auxiliary clamping unit
14 Dressing unit
15 First axis
16 Second axis
17 Dressing drive
18 Receptacle
19 Dressing tool
21 Cooling unit
23 Bellows
24, 24', 24" Rail guide
25 Guide rollers
26 Feed spindle
27 Clamping lever
28 Clamping jaws
29 Band stop groove
30 Feed drive

31 Feed slide
32 Contact surface
33 Processing space
34 Tool holder
35 Press down tool
36 Hydraulic hose
37 Spacing sleeve
38 Auxiliary clamping jaws
39 Machine bed
40 Tool holder
41 Adapter plate

We claim:

1. A device for grinding and/or milling teeth of saw bands, comprising:
   a feed device for the clocked feeding of a temporary workpiece, wherein the temporary workpiece is formed from a plurality of mutually parallel saw bands, wherein the feed device comprises a feed slide and a feed drive,
   a clamping unit arranged on the feed slide, the temporary workpiece being clamped into the clamping unit, such that the clamping unit and the temporary workpiece are displaced along a feed direction by the feed drive, and
   a machining unit with at least one machining tool for simultaneous machining of a plurality of teeth of the temporary workpiece, wherein the clamping unit is displaceable together with the feed device along the feed direction,
   wherein the clamping jaw edges of the clamping unit are oriented along the feed direction and are at least twice as long as a machining width of the machining tool, and
   wherein the clamping jaw edges have a tooth contour at least in sections with a plurality of teeth.

2. The device according to claim 1, wherein the clamping unit is arranged on the feed device.

3. The device according to claim 1, comprising a press down unit for pressing down the temporary workpiece that is arranged on the feed device.

4. The device according to claim 1, comprising a first auxiliary clamping unit arranged in front of the clamping unit along the feed direction and a second auxiliary clamping unit arranged behind the clamping unit along the feed direction.

5. The device according to claim 1, wherein the machining unit has a grinding tool and/or a milling tool.

6. The device according to claim 1, wherein the dressing unit is displaceable along a first and/or a second axis for dressing the machining tool, wherein the dressing unit has a respective dressing drive for the displacement along the first and second axis.

7. The device according to claim 6, wherein the dressing unit has a receptacle for receiving at least two dressing tools which are different from one another.

8. The device according to claim 6, wherein the machining unit has a sensor unit, wherein a contact between the machining tool and the dressing tool is measurable by the sensor unit.

9. The device according to claim 1, comprising a cooling unit for cooling the machining tool that comprises a plurality of nozzles directed at the machining tool.

10. A method for grinding and/or milling teeth of saw bands, comprising the following steps:
    pressing down and clamping a plurality of parallel, identical saw bands to generate a temporary workpiece,
    first simultaneous machining of a first plurality of teeth of the temporary workpiece to generate either tooth backs and/or tooth faces, first displacement of the temporary workpiece along a feed direction, second simultaneous machining of the first plurality of teeth to generate either tooth backs and/or tooth faces, depending on which were not generated during the first simultaneous machining, second displacement of the temporary workpiece along a feed direction, and direct repetition of the first displacement of the temporary workpiece and of the first and second simultaneous machining of a further plurality of teeth of the temporary workpiece.

11. The method according to claim 10, wherein the temporary workpiece is moved farther by the second displacement than by the first displacement.

12. The method according to claim 10, wherein the first and/or second displacement of the temporary workpiece is less than or equal to a machining width of a machining tool.

13. The method according to claim 10, wherein a clamping unit, clamping the temporary workpiece, and a feed unit, displacing the temporary workpiece, are moved together in an unchanging relative position to one another.

\* \* \* \* \*